US012777202B2

(12) United States Patent
Kalish

(10) Patent No.: US 12,777,202 B2
(45) Date of Patent: Oct. 27, 2026

(54) SYSTEM AND METHOD OF INTERACTIVE VIDEO

(71) Applicant: Idomoo LTD, Raanana (IL)

(72) Inventor: Danny Kalish, Raanana (IL)

(73) Assignee: Idomoo LTD, Raanana (IL)

( * ) Notice: Subject to any disclaimer, the term of this patent is extended or adjusted under 35 U.S.C. 154(b) by 0 days.

(21) Appl. No.: 18/184,348

(22) Filed: Mar. 15, 2023

(65) Prior Publication Data

US 2023/0300387 A1 Sep. 21, 2023

Related U.S. Application Data

(60) Provisional application No. 63/319,952, filed on Mar. 15, 2022.

(51) Int. Cl.

| | |
|---|---|
| ***H04N 21/2187*** | (2011.01) |
| ***G06T 17/00*** | (2006.01) |
| ***G06V 40/16*** | (2022.01) |
| ***G06V 40/20*** | (2022.01) |
| ***H04N 21/431*** | (2011.01) |
| ***H04N 21/472*** | (2011.01) |

(52) U.S. Cl.

CPC ......... *H04N 21/2187* (2013.01); *G06T 17/00* (2013.01); *G06V 40/174* (2022.01); *G06V 40/20* (2022.01); *H04N 21/4318* (2013.01); *H04N 21/47217* (2013.01)

(58) Field of Classification Search

CPC ........... H04N 21/2187; H04N 21/4318; H04N 21/47217; G06T 17/00; G06V 40/174; G06V 40/20

See application file for complete search history.

(56) References Cited

U.S. PATENT DOCUMENTS 10,846,517 B1 * 11/2020 Bulusu ................. G06V 40/161
11,146,834 B1 * 10/2021 Shen ................ H04N 21/64738
2007/0005795 A1 * 1/2007 Gonzalez ................ G06F 16/40 375/E7.006

(Continued)

*Primary Examiner* — Oschita I Montoya
(74) *Attorney, Agent, or Firm* — FisherBroyles LLP; Roger L. Browdy; James E. Mrose

(57) ABSTRACT

The present invention provides a player of interactive video, said player applying the following steps:

Supporting Playing stream video having pre-defined characteristics, of video layout, object which are configure to be manipulated in real time;

Monitoring means for identifying user behaviour while watching the video including: user interaction with the video, user entered data, user facial expression, micro facial expression, in relation to currently displayed video content characteristics for any video characteristics;

Analysing behaviour actions in relation to currently view video content to identify user characteristics;

Profile managing configured for updating user profile based on identified behaviour and characteristics;

Predicting users' instant behaviour based on analysed user behaviour and user profile;

Applying manipulation to video, while real time streaming the video to the pre-defined characteristics of video layout, objects, based on pre-defined rules related user updated profile, user current behaviour and instant predicted behaviour.

10 Claims, 6 Drawing Sheets

(56) References Cited

U.S. PATENT DOCUMENTS

| | | | | |
|---|---|---|---|---|
| 2016/0086365 | A1* | 3/2016 | Petti | G06T 11/60<br>345/474 |
| 2017/0316606 | A1* | 11/2017 | Khalid | G06T 17/00 |
| 2018/0218400 | A1* | 8/2018 | Kerns | G06Q 30/0256 |
| 2018/0300747 | A1* | 10/2018 | Kuzyakov | G06Q 30/0243 |
| 2019/0238952 | A1* | 8/2019 | Boskovich | G06F 16/7837 |
| 2020/0242384 | A1* | 7/2020 | Scott | G06V 20/42 |
| 2022/0180898 | A1* | 6/2022 | Ahmed | G06Q 30/0241 |
| 2022/0368984 | A1* | 11/2022 | Candelore | G06V 40/16 |

* cited by examiner

SYSTEM AND METHOD OF INTERACTIVE VIDEO

BACKGROUND

Technical Field

The present invention relates generally to generation of interactive parameter-based videos for based on user interaction.

SUMMARY

The present invention provides A player of interactive video, said player applying the following steps:

- Supporting Playing real time stream video having pre-defined characteristics, parameters, properties of video layout, object which are configure to be manipulated in real time
- Monitoring means for identifying user behaviour while watching the video including user interaction with the video, user entered data, user facial expression, micro facial expression, in relation to currently displayed video content/content characteristics for any video characteristics granular;
- Analysing behaviour actions in relation to specific currently view video content to identify user characteristics;
- Profile managing configured for updating user profile based on identified behaviour identify user characteristics;
- Predicting users' instant behaviour (physical or virtual behaviour) based on analysed user behaviour; and user profile
- Applying manipulation to video, while real time streaming the video to the pre-defined characteristics, parameters, properties of video layout, objects, based on pre-defined rules related user updated profile, user current behaviour and instant predicted behaviour;
- Moving video forward backward, fast, slow, shortening, long movie, adding scene, According to some embodiments of the present invention, the video is analysed at frame level per object, According to some embodiments of the present invention wherein the profile is public cluster profile, According to some embodiments of the present invention further comprising the step of Authenticating signature video parts in blockchain According to some embodiments of the present invention Supporting multi version video file, wherein each video has multiple different versions;

According to some embodiments of the present invention the video is part of virtual reality scene The present invention provides a method of playing of interactive video implemented in computer device, implemented by one or more processors operatively coupled to a non-transitory computer readable storage device, on which are stored modules of instruction code that when executed cause the one or more processors to perform said method comprising the steps of:

- playing real time stream video having pre-defined characteristics, parameters, properties of video layout, object which are configure to be manipulated in real time;
- monitoring and identifying user behaviour while watching the video in real time including at least one of: user interaction with the video, user entered data, user facial expression, micro facial expression, in relation to currently displayed video content/content characteristics for any video characteristics granular;

- analysing user behaviour actions in relation to specific currently displayed video content to identify user characteristics;
- profile managing and updating of user profile based on identified behaviour identify user characteristics;
- predicting users' instant behaviour based on analysed user behaviour; and user profile;
- applying manipulation to video, while real time streaming the video to the pre-defined characteristics, parameters, properties of video layout, objects, based on pre-defined rules related user updated profile, user current behaviour and instant predicted behaviour;

According to some embodiments of the present invention the video is analysed at frame level per object.

According to some embodiments of the present invention the profile is public cluster profile;

According to some embodiments of the present invention the method support multi version video file, wherein each video has multiple different versions;

According to some embodiments of the present invention the video is part of virtual reality scene According to some embodiments of the present invention wherein user behaviour include physical actions According to some embodiments of the present invention the user behaviour includes virtual behaviour in virtual scene.

According to some embodiments of the present invention the manipulation further include at least one of: Moving video forward backward, fast, slow, shortening, long movie, adding scene, According to some embodiments of the present invention the user behaviour is based on data acquired by user computer device sensors, user interface, virtual reality module, Wearable or device or environment Sensors.

The present invention disclose a player of interactive video implemented in computer device, implemented by one or more processors operatively coupled to a non-transitory computer readable storage device, on which are stored modules of instruction code that when executed cause the one or more processors to perform said method comprising the modules:

- player module for streaming real time stream video having pre-defined characteristics, parameters, properties of video layout, object which are configure to be manipulated in real time;
- monitoring module for identifying user behaviour while watching the video in real time including at least one of: user interaction with the video, user entered data, user facial expression, micro facial expression, in relation to currently displayed video content/content characteristics for any video characteristics granular;
- analyzing user behavior module configured for analysing user behaviour actions in relation to specific currently displayed video content to identify user characteristics;
- profile module configured for managing and updating user profile based on identified behaviour identify user characteristics;
- wherein Profile module is configured for predicting users' instant behaviour based on analysed user behaviour; and user profile;
- video generation module configured for applying manipulation to video, while real time streaming the video to the pre-defined characteristics, parameters, properties of video layout, objects, based on pre-defined rules related user updated profile, user current behaviour and instant predicted behaviour;

According to some embodiments of the present invention the video is analysed at frame level per object.

According to some embodiments of the present invention the profile is public cluster profile;

According to some embodiments of the present invention the system upporting multi version video file, wherein each video has multiple different versions;

According to some embodiments of the present invention the video is part of virtual reality scene.

According to some embodiments of the present invention the user behaviour includes physical actions.

According to some embodiments of the present invention the user behaviour include virtual behaviour in virtual scene;

According to some embodiments of the present invention the manipulation further include at least one of: Moving video forward backward, fast, slow, shortening, long movie, adding scene, According to some embodiments of the present invention the use behaviour is based on data acquired by user computer device sensors, user interface, virtual reality module, Wearable or device or environment Sensors.

BRIEF DESCRIPTION OF THE SCHEMATICS

The present invention will be more readily understood from the detailed description of embodiments thereof made in conjunction with the accompanying drawings of which:

DETAILED DESCRIPTION OF THE VARIOUS MODULES

Figure 1A:
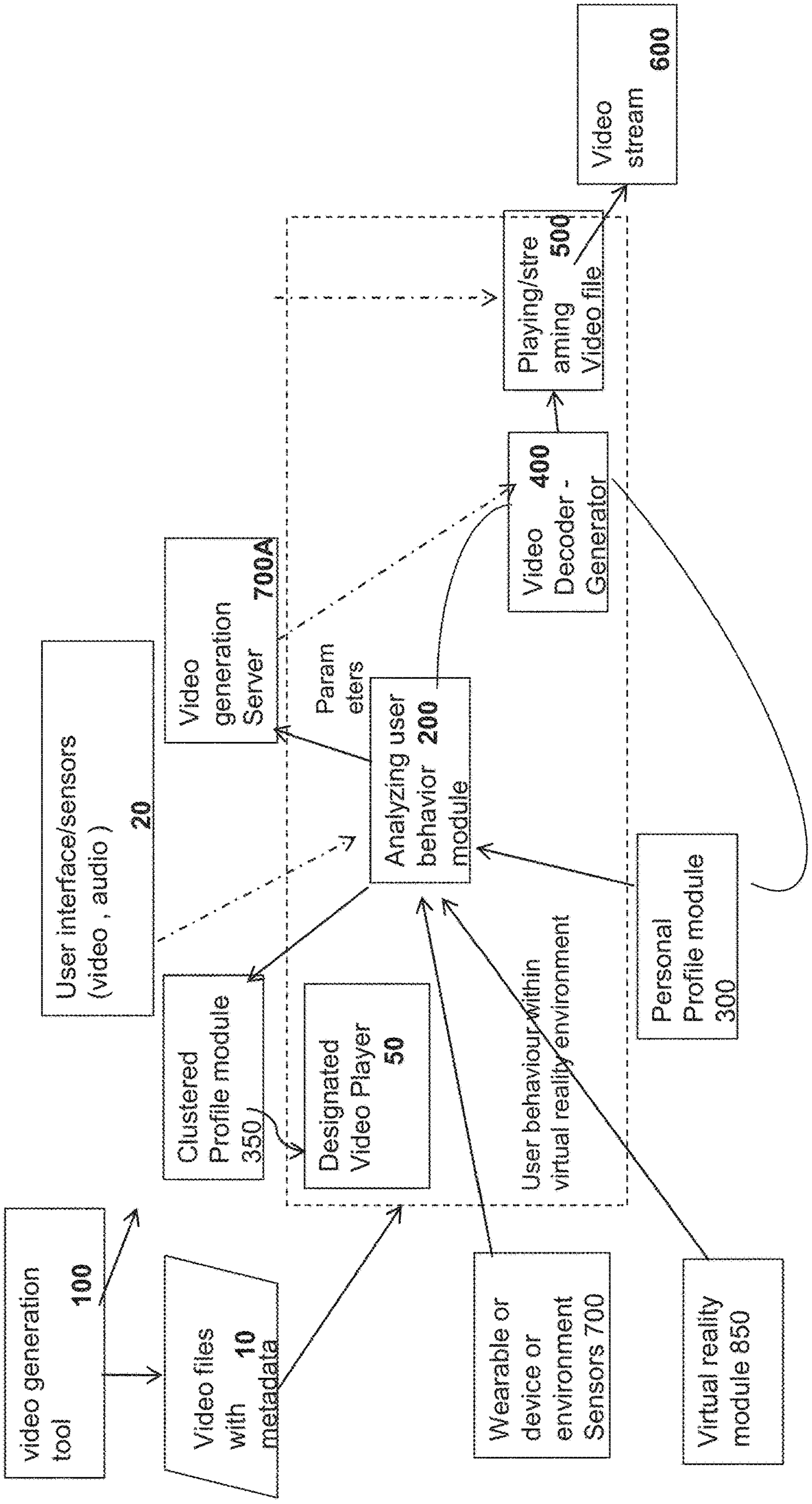
FIG. 1A is a block diagram, depicting the components and the environment of the video management system, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a list of definitions of the terms used throughout this application, adjoined by their properties and examples.

DEFINITION

Video instruction metadata contains data that are essential for drawing blueprints for the scene: including at least one of the following:

A composition of what elements to draw and where/when/how they should be drawn, transformed, animated, etc.).

The metadata may include text, images, and video, how they all move and appear throughout time together and with respect to each other.

The metadata include data of the 'scene graph' of the scene (i.e., how the scene is to be drawn from all of its elements, and throughout time).

FIG. 1A is a block diagram, depicting the components and the environment of the video management system, according to some embodiments of the invention.

A video generation tool 100 enables to build a video file configured to be played by a designated player in live (real time) responsive to user interactions based on use profile. The designated video player is comprised of video analyser tool 200, which receive user interaction data from various sources: user device sensors, user interface, optionally virtual reality module 300, Wearable or device or environment Sensors 350, the received data is aggerated and analyzed based on user personal profile, or cluster profile, to alter, change video to adapt to user current behaviour, predicted behaviour. Based on said analysis are sent instructions to video generator video 700A to produce in real time, video adapted an accommodated to user current and instance predicted behaviour. Optionally the video may be pause, fast forward/backward or delayed.

According to some embodiment of the present invention the video may simulate Virtual seller interactive reacting to at least one user request, behavior or reaction, the virtual seller may interact with multiple users at the same period.

According to some embodiment of the present invention the video may be part of virtual reality space and part of identified user behaviours relates to Identifying distance of user from defined target in virtual space.

Figure 1B:
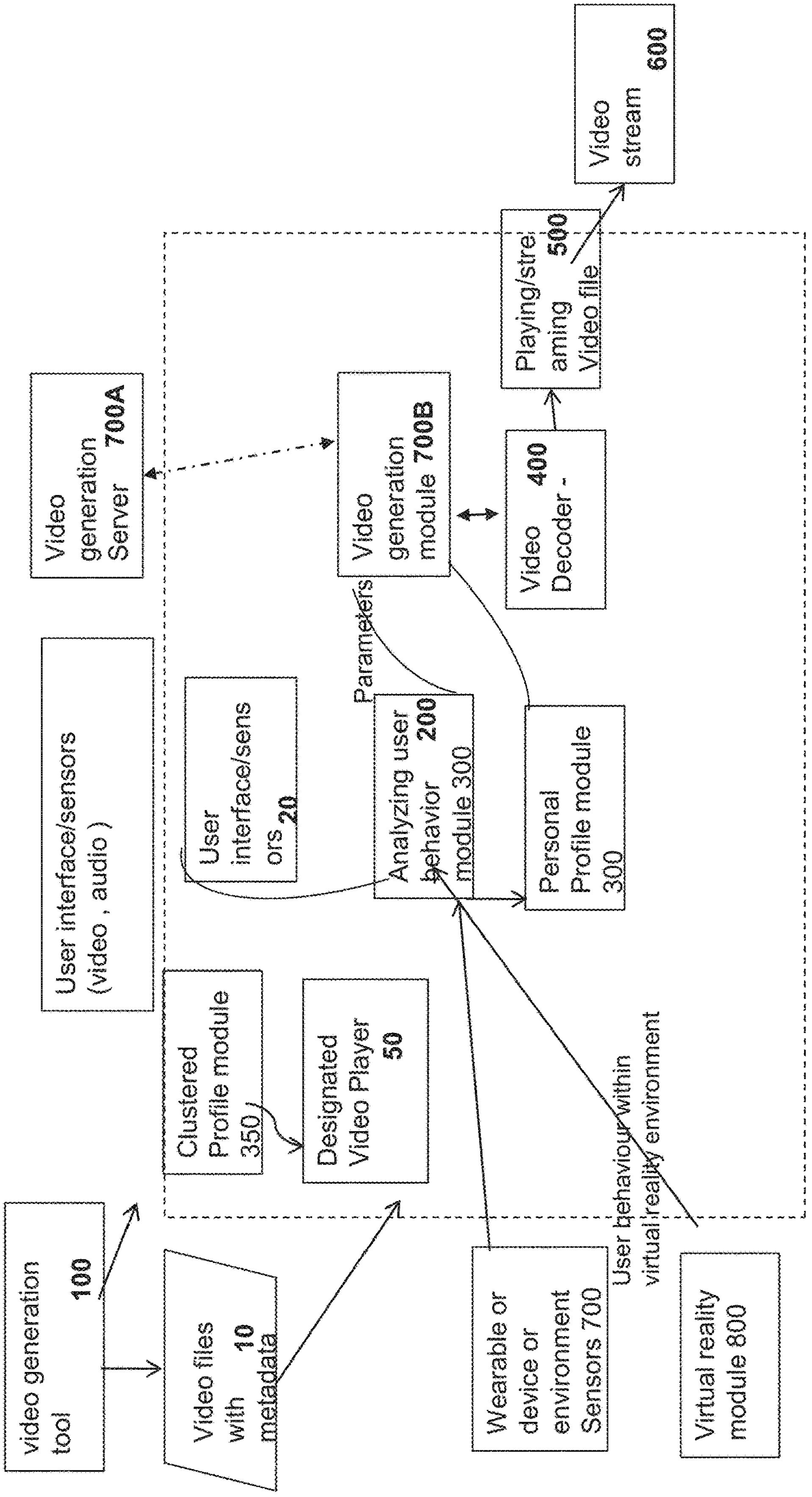
FIG. 1B is a block diagram, depicting the components and the environment of the video management system, according to some embodiments of the invention.

FIG. 1B is a block diagram, depicting the components and the environment of the video management system, according to some embodiments of the invention.

According to this embodiment, the player includes video generator module 700B configured to generate at least part of the video incorporation the video generator server 700A or fully generate the video with the player. Optionally the profile module is part of the player.

Figure 2:
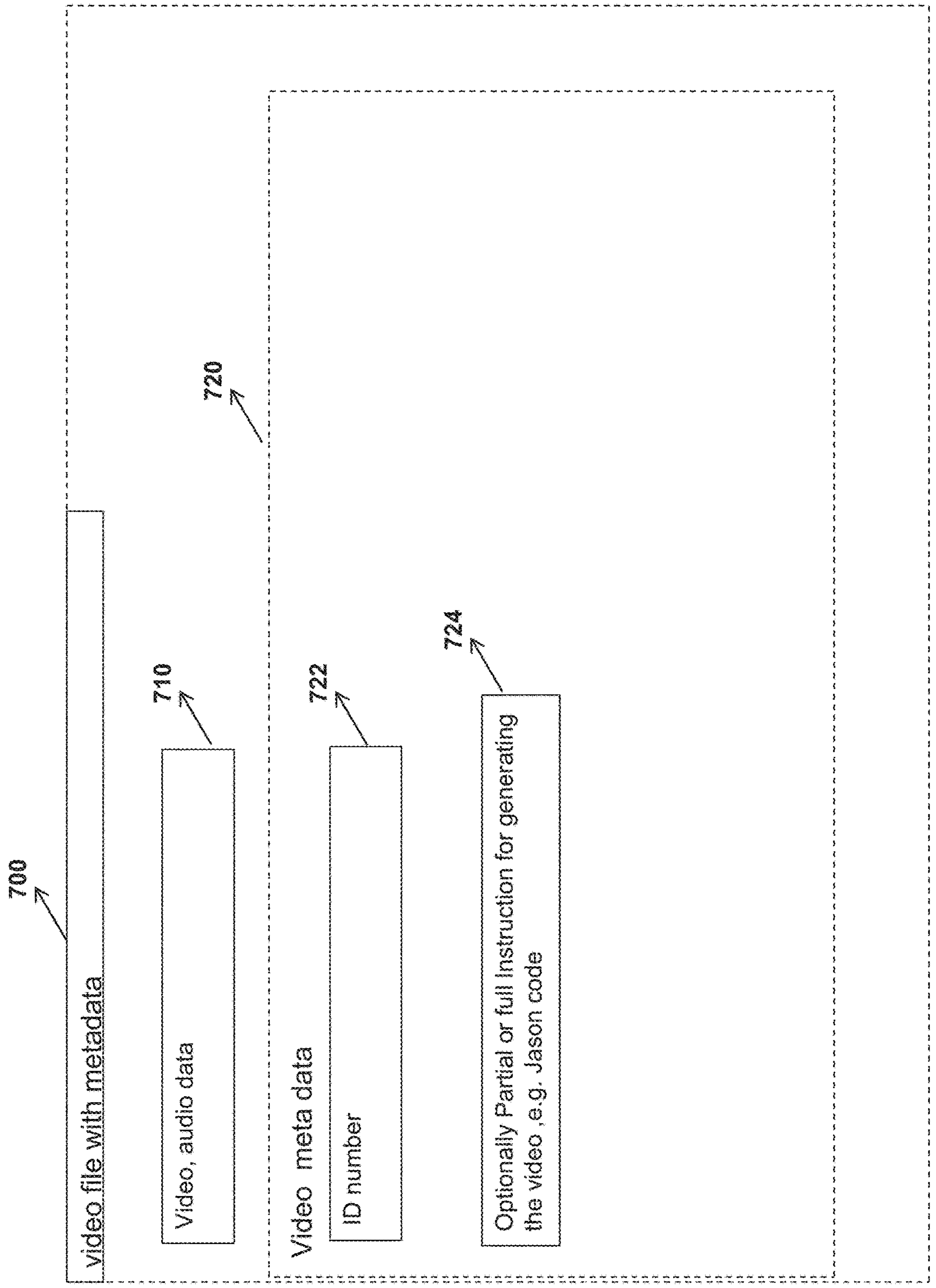
FIG. 2 is a block diagram depicting the video file format information structure, according to one embodiment of the invention.

FIG. 2 is a block diagram depicting the video file format information structure, according to one embodiment of the invention. The video meta file include audio data 710, Id number 772 and Optionally Partial or full Instruction for generating the video, e.g. Jason code 724.

Figure 3:
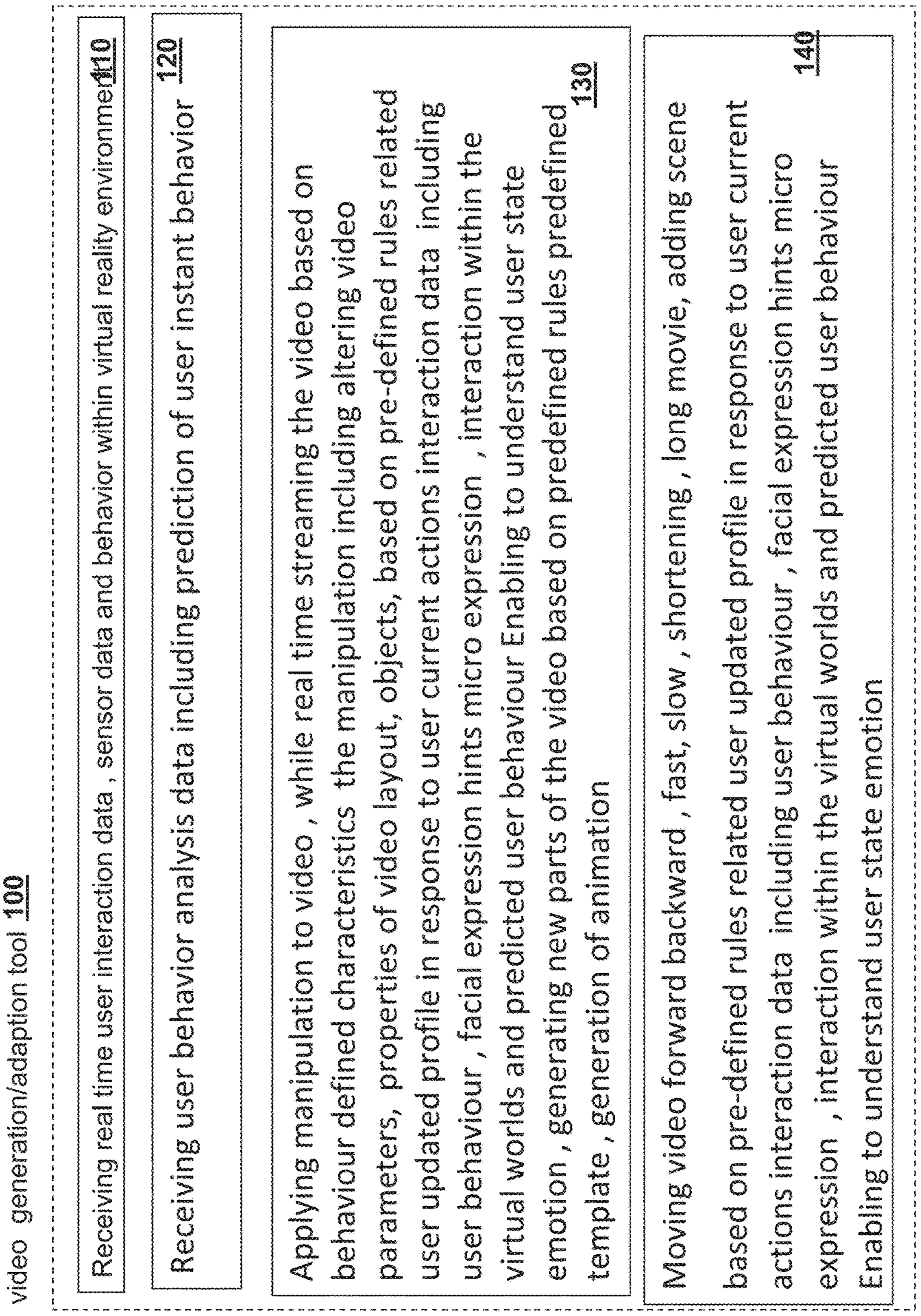
FIG. 3 is a flowchart depicting the video generation tool 100, according to some embodiments of the invention.

FIG. 3 is a flowchart depicting the video generation tool 100, according to some embodiments of the invention.

Figure 4:
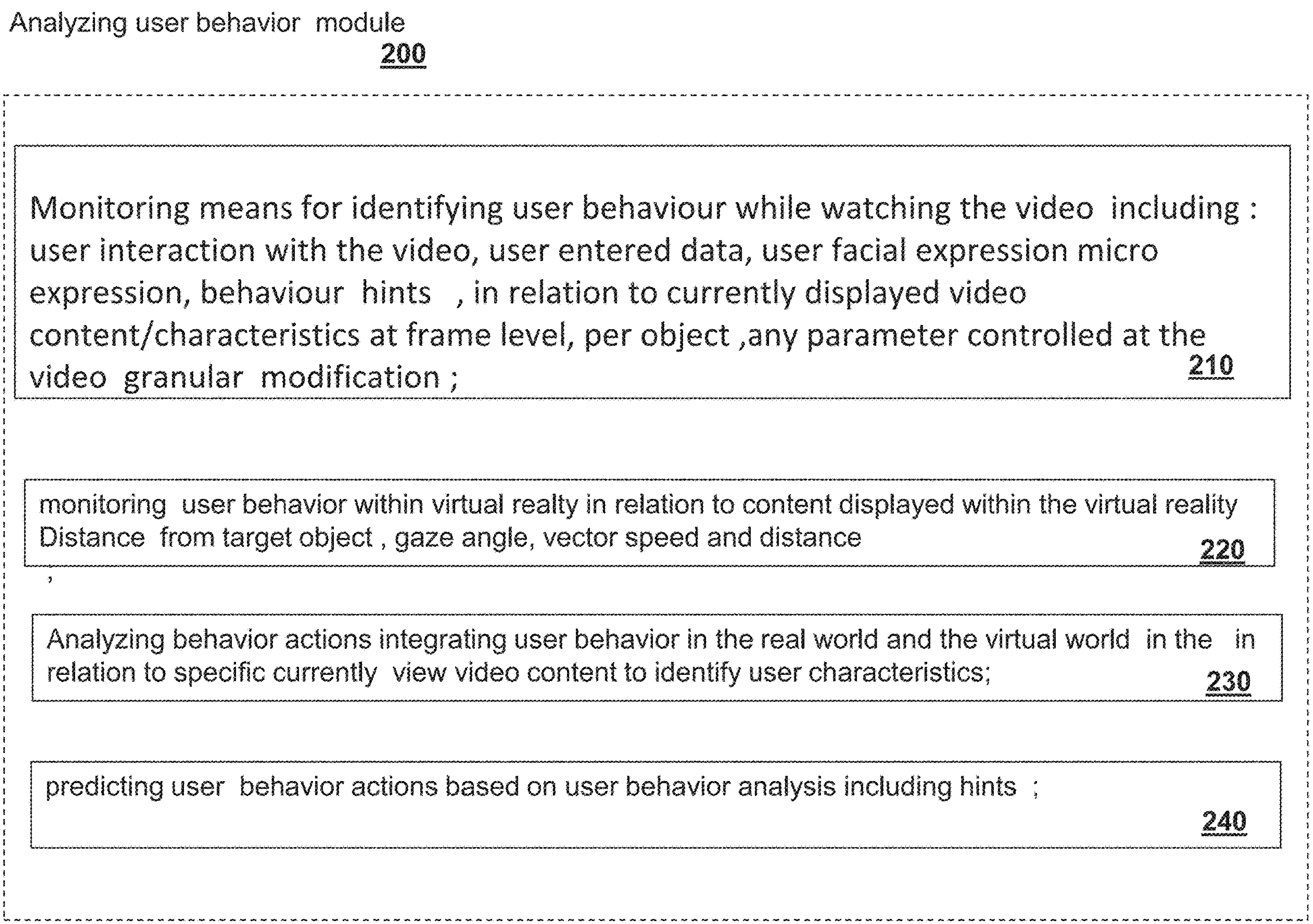
FIG. 4 is a flowchart depicting the user behavior analysis 200, according to some embodiments of the invention.

The video generation tool applies at least one of the following steps:

- Receiving real time user interaction data, sensor data and behavior within virtual reality environment 110;
- Receiving user behavior analysis data including prediction of user instant behavior; 120
- Applying manipulation to video, while real time streaming the video based on analysed behaviour and predicted instant behaviour and user profile characteristics the manipulation including altering video parameters, properties of video layout, objects, based on pre-defined rules related user updated profile in response to user current actions interaction data including user behaviour, facial expression hints micro expression, interaction within the virtual worlds and predicted user behaviour Enabling to understand user state emotion
- generating new parts, the video based on predefined rules predefined template, generation of animation generating new parts the video based on predefined rules predefined template, generation of animation 130;

Moving video forward backward, fast, slow, shortening, long movie, adding scene based on pre-defined rules related user updated profile in response to user current actions interaction data including user behaviour, facial expression hints micro expression, interaction within the virtual worlds and predicted user behaviour Enabling to understand user state emotion 140;

FIG. 4 is a flowchart depicting the user behavior analysis module 200, according to some embodiments of the invention.

The user behavior analysis module applies at least one of the following steps:

Monitoring means for identifying user behaviour while watching the video including: user interaction with the video, user entered data, user facial expression, user body expression, hands movements in relation to currently displayed video content/content characteristics at frame level, per object, any parameter controlled at the video granular modification; 210

Analyzing behavior actions in relation to specific currently view video content to identify user behaviour characteristics in relation to current behavior; 220

Figure 5:
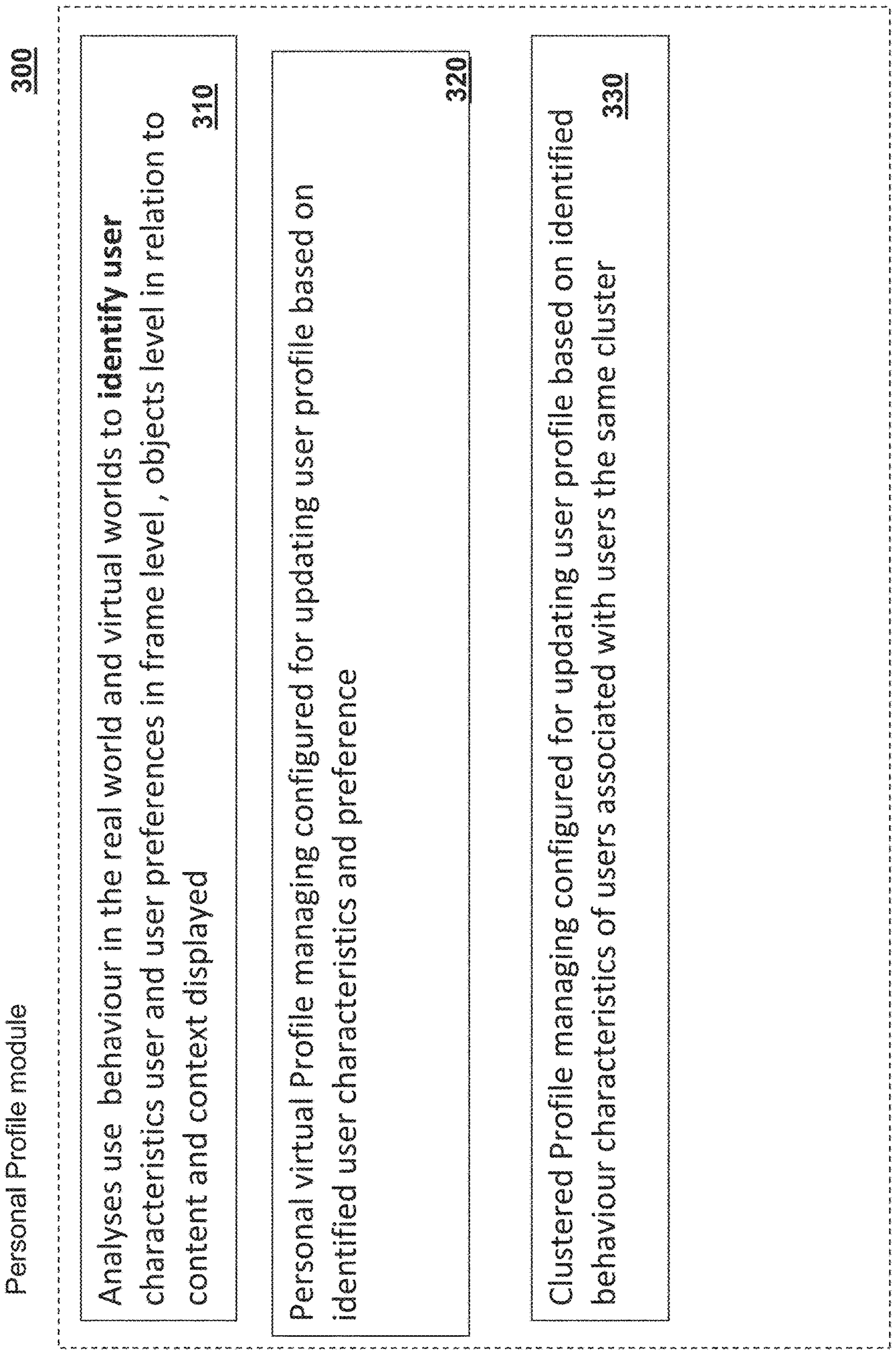
FIG. 5 is a flowchart depicting the profile management tool 300, according to some embodiments of the invention.

Analyzing behavior actions integrating user behavior in the real world and the virtual world in the in relation to specific currently view video content to identify user characteristics (230);

predicting user behavior actions based on user behavior analysis including hints (240);

FIG. 5 is a flowchart depicting the profile management tool 300, according to some embodiments of the invention.

The profile management tool applies at least one of the following steps:

Analyses use behaviour in the real world and virtual worlds to identify user characteristics and user preferences in frame level, objects level in relation to content and context displayed 310;

Personal virtual Profile managing configured for updating user profile (in real time) based on identified user characteristics and user preferences; (320);

Clustered Profile managing configured for updating user profile based on identified behaviour characteristics of users associated with the same cluster (330);

According to some embodiments of the present invention the player interactive video real time stream video predefined characteristics are manipulated in real time based om monitoring user behaviour interaction with the video and updated user profile based on identified behaviour.

According to some embodiments of the present invention player interactive video support multi version video file, each video has multiple different versions. The different versions are adapted to different user profiles.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitably operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g., digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method of playing of interactive video implemented in a computer device, implemented by one or more processors operatively coupled to a non-transitory computer readable storage device, on which are stored modules of instruction code that when executed cause the one or more processors to perform said method comprising the steps of:

playing, by a designated video player, a real-time stream two-dimensional video, comprising a sequence of video frames, having pre-defined characteristics, parameters, properties of two-dimensional video layout and two-dimensional objects which are configured to be manipulated in real time;

monitoring and identifying user behavior while watching the video in real time including at least one of: user interaction with the video, user entered data, user facial expression including micro facial expression, in relation to currently displayed video content or characteristics for any video characteristics granular;

analyzing user behavior actions in relation to specific currently displayed video content to identify user characteristics;

profile managing and updating of a user profile based on identified behavior to identify user characteristics;

predicting users' instant behavior based on analyzed user behavior and user profile; and applying manipulation in real time to said two-dimensional video comprising the sequence of video frames, and simultaneously generating new parts of said video, while real time streaming the video, wherein both the manipulation and the generating of new parts are driven simultaneously by all three of: (a) pre-defined rules related to the user updated profile, (b) the user current behavior during the real-time streaming, and (c) the instant predicted behavior, wherein the video manipulation comprises modifying specific characteristics, parameters, or properties of two-dimensional objects that remain within the video stream without replacing said objects entirely, and altering properties of two-dimensional video layout including spatial arrangement and composition of the scene, said manipulation being applicable to any ones of the two-dimensional objects which are part of the video stream, based on the user updated profile, the user current behavior during the real-time streaming, and instant predicted behavior.

2. The method of claim 1 wherein the video is analyzed at frame level per object.

3. The method of claim 1 wherein the profile is public cluster profile.

4. The method of claim 1 supporting multi version video file, wherein each video has multiple different versions.

5. The method of claim 1 wherein the video is part of virtual reality scene.

6. The method of claim 1 wherein user behavior includes physical actions.

7. The method of claim 1 wherein user behavior includes virtual behavior in virtual scene.

8. The method of claim 1 wherein the manipulation further includes at least one of: Moving video forward backward, fast, slow, shortening, long movie, adding scene.

9. The method of claim 1 wherein user behavior is based on data acquired by user computer device sensors, user interface, virtual reality module, wearable or device or environment sensors.

10. The method of claim 1 further comprising the step of generating new animation parts of the video based on predefined rules or predefined template, related to user updated profile, user current behavior and instant predicted behavior.

* * * * *